United States Patent [19]

Despres et al.

[11] Patent Number: 4,648,499
[45] Date of Patent: Mar. 10, 1987

[54] RELEASE BEARING MOUNTING

[75] Inventors: Dominique Despres, Clichy; Philippe Lassiaz, Boulogne, both of France

[73] Assignee: Valeo, Paris, France

[21] Appl. No.: 683,390

[22] Filed: Dec. 19, 1984

[30] Foreign Application Priority Data

Dec. 27, 1983 [FR] France ................. 83 20829

[51] Int. Cl.[4] ............................................ F16D 23/14
[52] U.S. Cl. .................................. 192/98; 192/110 B; 192/70.13; 192/89 B; 29/426.5; 29/453
[58] Field of Search .................. 192/98, 110 B, 89 B, 192/DIG. 1; 403/322, 325; 29/426.5, 453

[56] References Cited

U.S. PATENT DOCUMENTS

| | | | |
|---|---|---|---|
| 4,228,882 | 10/1980 | Huber et al. ............................ | 192/98 |
| 4,399,898 | 8/1983 | Olschewski et al. .................. | 192/98 |
| 4,405,041 | 9/1983 | Broadbent .............................. | 192/98 |
| 4,456,111 | 6/1984 | Limbacher ........................ | 192/98 X |
| 4,498,566 | 2/1985 | Renaud ................................... | 192/98 |
| 4,502,583 | 3/1985 | Limbacher ............................. | 192/98 |
| 4,529,076 | 7/1985 | Renaud ................................... | 192/98 |

FOREIGN PATENT DOCUMENTS

| | | | |
|---|---|---|---|
| 3113463 | 12/1982 | Fed. Rep. of Germany . | |
| 2304826 | 10/1976 | France .................................. | 192/98 |
| 2508997 | 1/1983 | France . | |
| 1441804 | 7/1976 | United Kingdom .................. | 192/98 |
| 2062799 | 5/1981 | United Kingdom . | |

Primary Examiner—Rodney H. Bonck
Assistant Examiner—David A. Testardi
Attorney, Agent, or Firm—Charles E. Brown; Charles A. Brown

[57] ABSTRACT

In a clutch release bearing there is provided a groove for the coupling ring ensuring its coupling to the coupling member provided to this end on the side of the clutch release device to be operated opposite that facing the clutch release bearing. The flank of this groove disposed on the side of the clutch release bearing forms part of a decoupling member mounted to slide axially.

17 Claims, 15 Drawing Figures

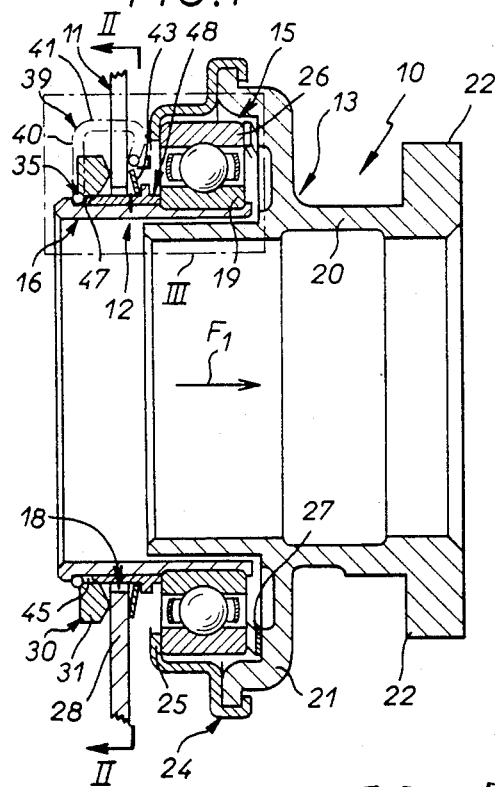

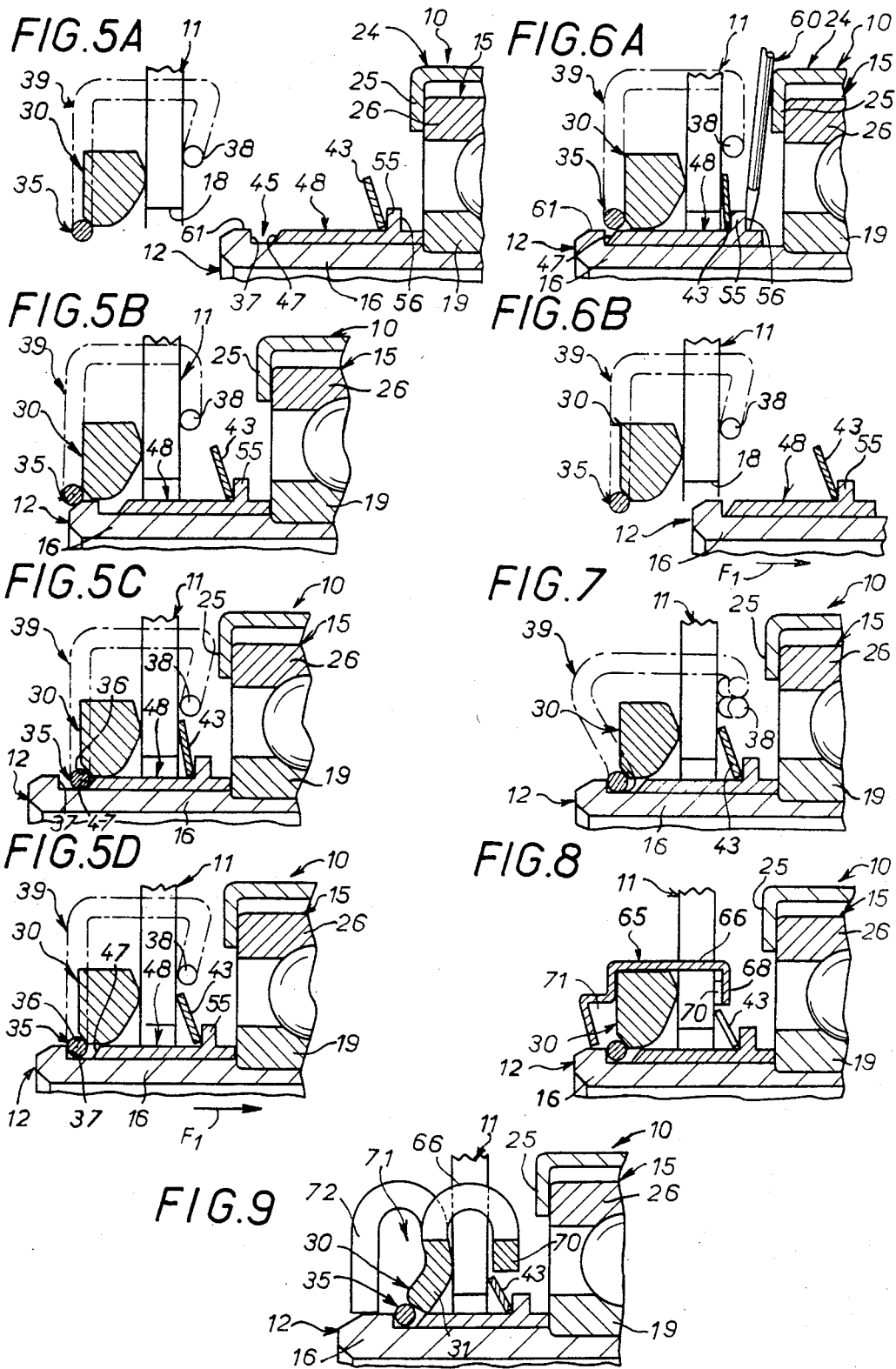

RELEASE BEARING MOUNTING

The present invention, patent application Ser. No. 535,071 filed Sept. 23, 1983, and patent application Ser. No. 571,671 filed Jan. 17, 1984 are commonly owned by the same entity.

The present invention is generally concerned with clutch release bearings, of the type for example designed for equipping automobile vehicles, and it is more particularly directed towards the case where, in order to release the clutch, the clutch release bearing must act in traction on the clutch release device which the clutch comprises for this purpose.

The problem in this instance is that, although necessarily disposed for the main part outside the clutch, the clutch release bearing must nevertheless be able to act within the latter, on the internal surface of the clutch release device, so as to be capable of exerting traction on it.

To overcome this difficulty, it is usual to couple the clutch release bearing to the clutch release device in at least one axial direction, being that corresponding to traction on the clutch release device.

More precisely, for the purposes of such coupling of the clutch release bearing to the clutch release device, it is usual to associate with the latter an auxiliary member, referred to hereinafter for convenience as the coupling member, which, on the side of the clutch release device opposite the clutch release bearing, has a radial flange through the intermediary of which it is adapted to bear on the clutch release device in the required axial direction, and to which the clutch release bearing may be coupled in at least the axial direction corresponding to the application of traction to the clutch release device, extending from this coupling member to the clutch release bearing.

In practice, a coupling member of this kind is fitted in advance to the clutch release device of the clutch to be operated, and thus to the corresponding "clutch cover assembly", that is to say the assembly of parts which, in order to constitute a clutch of this kind, is adapted to be fitted as a unit to any form of reaction plate attached to the corresponding shaft.

It then remains to provide the necessary axial coupling between the coupling member and the clutch release bearing.

It has been proposed to use a snap action, employing for this purpose a ring, referred to as a coupling ring, which is elastically deformable in the radial direction, annularly disposed around the axis of the assembly, and adapted to be at least partially engaged, on the same side as said clutch release bearing, with a bearing surface on said coupling member and, on the opposite side, with a bearing surface on said clutch release bearing.

An arrangement of this type is described in particular in U.S. patent application Ser. No. 571,671 filed Jan. 17, 1984.

In practice, in this patent application, the coupling ring employed is itself fitted in advance to the clutch cover assembly concerned, in association with retaining means adapted to ensure axial coupling of the coupling member to the clutch release device, said coupling member being thus coupled to said clutch release device in both axial directions, possibly with play.

In practice, the bearing surface on the clutch release bearing with which the coupling ring is to cooperate is formed by one flank of an annular groove provided for this purpose on the clutch release bearing, more precisely on a bush forming an axial extension of one of the rings of the ball bearing which the clutch release device usually comprises and constituting the drive member through which, through the intermediary of the coupling member, it is adapted to operate on the clutch release device of the clutch to be operated.

In practice, in this patent application, elastic bearing means are provided which, bearing axially on the clutch release bearing on the side of the clutch release device opposite the coupling ring, bear axially on said clutch release device to retain said coupling ring in engagement with the bearing surfaces with which it is to cooperate, as well as to maintain the coupling member in contact with the clutch release device.

Be this as it may, by virtue of the snap-fastener means constituted by the coupling ring and these bearing surfaces, the clutch release bearing, which is in this case commonly referred to as of the "clip-on" type, can with advantage be fitted after the clutch cover assembly has itself been fitted to the corresponding reaction plate.

All that is necessary is to insert the clutch release bearing axially into the central opening in the clutch release device of the clutch cover assembly: during such insertion, the coupling ring retracts elastically and, subsequently resuming its initial configuration between the bearing surfaces with which it is to cooperate, it ensures the necessary axial coupling between the clutch release bearing and the coupling member.

From this point of view, an arrangement of this kind is satisfactory.

Nevertheless, there may arise the problem of possible uncoupling of the clutch release bearing with respect to the clutch cover assembly, in order to change it, for example.

At present, it is necessary to operate on the internal surface of the clutch release device, since it is on the side of this internal surface that the corresponding coupling ring is disposed, which involves demounting the clutch cover assembly from the reaction plate or support flange to which it is attached.

This is always a relatively lengthy and complex operation to undertake.

A general object of the present invention is an arrangement which, when necessary, allows the clutch release bearing to be detached from the coupling member without removal of the clutch cover assembly.

More precisely, a first object of the invention is a clutch release bearing assembly of the kind comprising, for coupling a clutch release bearing to the clutch release device of a clutch in at least one axial direction, being that corresponding to traction on said clutch release device by said clutch release bearing, an auxiliary member referred to as the coupling member having on the side of the clutch release device opposite the clutch release bearing a radial bearing flange through the intermediary of which it is adapted to bear axially on said clutch release device so as to actuate the latter in the required direction, a ring referred to as the coupling ring deformable in the radial direction, extending annularly around the axis of the assembly and at least partially engaged, on the same side as the clutch release bearing, with a bearing surface on the coupling member and, on the opposite side, with a bearing surface on said clutch release bearing, said bearing surface on the clutch release bearing being in practice formed by one flank of an annular groove provided for this purpose on said clutch release bearing, and retaining means adapted to fasten said coupling member axially to said clutch release device, possibly with play, this clutch release bearing assembly being generally characterized in that the other flank of the groove which the clutch release bearing this comprises is axially mobile relative to the first-mentioned flank; further objects of the invention are a clutch release bearing adapted for use in an assembly of this kind and a process for detaching same in the axial direction.

In practice, the clutch release bearing in accordance with the invention comprises, in the usual manner, an axial bush by means of which it extends axially through the clutch release device of the clutch and at the end of which is formed the bearing surface for the coupling ring, the other flank of the groove of which said bearing surface forms a first flank forms part of a member, referred to hereinafter for convenience as the decoupling member, which is separate from said bush, mounted slidably on the latter and, formed for example by the edge of the decoupling member, extends obliquely to the axis of the assembly, moving away from said first flank as it moves away from said axis.

Given this arrangement, and whilst a snap action assembly remains a possibility, given the same conditions as previously, it is then sufficient, if it should prove necessary to detach the clutch release bearing from the coupling member, to operate appropriately on the decoupling member, via a shoulder on the latter opposed to the clutch release device, and to move it axially in the direction towards the coupling ring.

As the decoupling member projects outside the clutch cover assembly, operating on it is very easy and does not entail any action within the interior volume of the clutch cover assembly.

It may be carried out, for example, using any operating means, a screwdriver for example, appropriately inserted to this end in the direction towards the axis of the assembly between the clutch release bearing and the clutch release device of the clutch concerned.

The decoupling member in accordance with the invention preferably features, for the purposes of using operating means of this kind, a transverse shoulder which in the axisl direction faces away from the side opposite that of its edges by virtue of which it forms one of the flanks of the groove which the clutch release bearing comprises for the coupling ring or, in other words, axially away from the side opposed to the clutch release device.

Be this as it may, when it is moved axially in the direction towards the coupling ring, the decoupling member in accordance with the invention, which is in practice initially spaced from the coupling ring, comes into contact with the latter via its edge and, given the oblique disposition of this edge, it progressively and elastically pushes back the latter in the radial direction away from the axis of the assembly, thus moving it out of the groove in which it is disposed by progressively reducing the width of the latter, until, escaping from the bearing surface on the clutch release bearing forming one of the flanks of this groove, said coupling ring no longer provides coupling in the axial direction considered such as it previously ensured between the clutch release bearing and the coupling member.

The required axial decoupling of the clutch release bearing from the coupling member is thus obtained in a very simple manner.

In accordance with a further feature of the invention, elastic bearing means being provided which, bearing axially on the clutch release bearing on the side of the clutch release device opposite the coupling ring, bear axially on said clutch release device, these elastic bearing means preferably bear on the decoupling member, thus urging the latter continuously in the direction towards a transverse abutment member provided for it on the clutch release bearing.

Thus, in addition to their usual function, these elastic bearing means advantageously implement a supplementary function, which is to maintain the decoupling member normally in bearing engagement with its abutment member.

In accordance with a further feature of the invention, the clutch release bearing comprising, for the purpose of acting on the clutch release device, a drive member itself comprising a ball bearing, the bush on which the decoupling member is slidably mounted is preferably a part attached, as by crimping, to one ring of said ball bearing.

As a result of this, the latter may advantageously be a standard ball bearing.

There is certainly described in French Pat. No. 2,508,997 a clutch release bearing assembly which, structurally, is of a type comparable with that constituting the object of the present application.

However, while at the rear of the clutch release device, that is to say on the side opposite the latter relative to the clutch release bearing, there is actually used a coupling member for the purposes of application of traction by the clutch release bearing to the clutch release device, this bearing member is in simple bearing engagement against the clutch release device, no retaining means being provided to fasten it in the axial direction to the clutch release device, that is to say to link it axially to the latter in both axial directions, possibly with play.

Moreover, while in this French Pat. No. 2,508,997 use is actually made of a ring between the clutch release bearing and the coupling member, there is no snap action involved between these members at the time of assembly, the coupling ring having to be fitted from the rear, from the side of the clutch release device opposite the clutch release bearing, and no subsequent demounting of the clutch release bearing from the front is provided for.

Moreover, in the absence of retaining means adapted to provide axial coupling of the coupling member to the clutch release device, a snap action of this kind is not feasible.

It is also certain that a snap action is employed in British Pat. No. 2,062,799.

However, in practice this British Pat. No. 2,062,799 concerns a clutch release bearing assembly which is structurally very different from that constituting the object of the present application.

In particular, the clutch release bearing employed is essentially housed within the axial opening of the clutch release device to which it is applied.

Also, the coupling ring is not engaged with the coupling member, but with the inside ring of a bearing whose outside ring forms this coupling member.

It is true, however, that it is here proposed to house this coupling ring in a groove of which one flank forms part of a decoupling member mounted axially mobile.

But this decoupling member must operate continuously on the coupling ring to maintain it in the deployed configuration.

Thus the groove in which this coupling ring is housed normally is of minimum width, and must be widened when demounting is required.

It is thus an arrangement which is exactly the converse of that described in the present application, in which, the decoupling member being initially spaced from the coupling ring, the corresponding groove normally has a maximum width and must be made narrower when demounting is required.

Moreover, in this British Pat. No. 2,062,799, in order to urge the decoupling member in the direction towards the coupling ring, it is necessary to associate with it specific elastic means separate from those maintaining the coupling member in contact with the clutch release device with which it is associated.

The objects of the invention, their characteristics and their advantages will emerge from the following description given by way of example with reference to the appended schematic drawings in which:

FIG. 1 is a view in axial cross-section of a clutch release bearing assembly in accordance with the invention, on the broken line I—I in FIG. 2;

FIG. 2 is a partial view of it in elevation and cross-section on the broken line II—II in FIG. 1;

Figure 11:
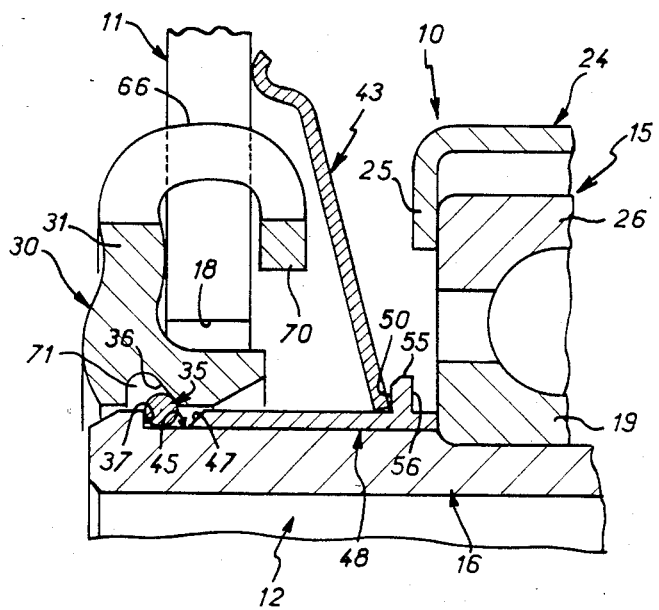

FIG. 3 repeats to a larger scale the detail of FIG. 1 indicated by the box III on the latter;

FIG. 4 is a partial view in circumferential cross-section on the line IV—IV in FIG. 3, developed in the flat;

FIGS. 5A, 5B, 5C and 5D are views analogous to that of FIG. 3 which illustrate the snapping on of the clutch release bearing during assembly of the assembly;

FIGS. 6A and 6B are views also analogous to that of FIG. 3 which illustrate detachment of the clutch release bearing from the clutch with which it is associated, in the axial direction;

FIGS. 7, 8 and 9 are views analogous to that of FIG. 3 and each relating to a respective alternative embodiment;

FIG. 10 is a view analogous to that of FIG. 4 and also concerns an alternative embodiment;

FIG. 11 is a view analogous to that of FIG. 3 and concerns a further embodiment.

As shown in these figures and as more clearly seen in FIG. 1, the overall object is to attach a clutch release bearing 10 to the clutch release device 11 of a clutch, in at least one axial direction, being that corresponding to traction on said clutch release device 11 by said clutch release device 10, as schematically indicated by the arrow F1 in FIG. 1.

Overall, and in a manner known per se, the clutch release bearing 10 comprises, on the one hand, a drive member 12 which acts on the clutch release device 11 and, on the other hand, an operating member 13 on which acts a control member, in practice a clutch release yoke.

In the embodiment shown, the driven member 12 itself comprises a ball bearing 15 and, axially attached to one of the rings of the latter, by virtue of arrangements to be described in more detail hereinafter, a bush 16 by virtue of which the clutch release bearing 10 extends axially through the clutch release device 11, be means of the central opening 18 in the latter.

In practice, in the embodiments shown, the bush 16 is axially coupled to the inside ring 19 of the ball bearing 15.

In the embodiments shown, the operating member 13 itself comprises an axial sleeve 20 for engaging it on any form of support and guide member and a transverse flange 21 which acts on the drive member 12.

It further comprises, spaced from and parallel to its flange 21, on the side opposite the drive member 12, two transverse radial arms 22 on which acts the associated control member.

In the embodiments shown, the drive member 12 is coupled to the operating member 13 by a cover 24 which is crimped to the flange 21 of the operating member 13 and which, in order to act on the drive member 12, has a rim 25 directed radially towards the axis of the assembly against which bears in the axial direction the outside ring 26 of the ball bearing 15 which said drive member 12 comprises.

As this is a self-centring clutch release bearing, specific annular play is provided between, on the one hand, the drive member 12 and, on the other hand, both the sleeve 20 of the operating member 13 and the cover 24 attached to the flange 21 of the latter.

More precisely, as it is a self-centring clutch release bearing of the maintained self-centring action type, axially acting elastic means are operative between the drive member 12 and the operating member 13.

These comprise, for example and as shown, a corrugated elastic ring 27 of the type marketed under the trade name "ONDUFLEX", inserted axially between the flange 21 of the operating member 13 and the outside ring 26 of the ball bearing 15 of the drive member 12.

These arrangements are well known per se and as they do not of themselves constitute the object of the present invention they will not be described in more detail here.

Likewise, the clutch release device 11 will not be described in full detail here.

It is sufficient to indicate that, in the embodiments shown, it consists of the central part of an annular member commonly referred to as a diaphragm spring, subdivided into radial fingers 28 by slots 29.

In a manner also known per se, and as described in detail in the aforementioned U.S. patent application Ser. No. 571,671 there is provided for coupling the clutch release bearing 10 to the clutch release device 11, on the side of the clutch release device 11 opposite the clutch release bearing 10, an auxiliary member 30 commonly referred to as the coupling member.

In the embodiments shown in FIGS. 1 through 8 and 10 this is a massive member.

Alternatively (FIGS. 9 and 11) it is a member obtained by stamping, rolling or any other material shaping technique.

Be this as it may, it features a radial bearing flange 31 through which it is adapted to bear axially on the clutch release device 11.

In practice, in the embodiments specifically shown in FIGS. 1 through 6, it is essentially reduced to this bearing flange 31 whilst featuring, locally and at positions diametrally opposed to one another, for reasons which will emerge hereinafter, two bosses 32 each featuring, on its side opposite the clutch release device 11, a radial groove 33 and, on its edge, an axial groove 34.

Finally, for axial coupling of the clutch release bearing 10 and the coupling member 30, there is provided a ring 35, referred to for convenience as the coupling ring, which is elastically deformable in the radial direction, disposed annularly around the axis of the assembly and at least in part engaged, on the same side as the clutch release bearing 10, with a bearing surface 36 on the coupling member 30 facing away from the clutch release device 11 and, on the opposite side, with a bearing surface 37 on the clutch release bearing 10 facing said clutch release device 11.

By virtue of arrangements which are the subject matter of the hereinabove mentioned U.S. patent application Ser. No. 571,671, and which will therefore not be described in detail here, as they are not relevant to the object of the present application, this coupling ring 35, in the embodiments shown in FIGS. 1 through 6, is in one piece with a member 39 also forming retaining means adapted to ensure axial coupling of the coupling member 30 to the clutch release device 11, this member 39 forming to this end, at positions diametrally opposed to one another, in the embodiments specifically shown in FIGS. 1 through 5, two retaining bars 38, 38' which, continuous with the ring 35 by virtue of respectively radial and axial portions 40 and 41 of the member 39 disposed at the respective locations of the radial and axial grooves 33 and 34 of the bosses 32 on the coupling member 30, extend transversely from the side of the clutch release device 11 opposite said coupling member 30, the retaining bar 38 being formed by the folding back on itself, loop-fashion, of said member 39 and the retaining bar 38' being formed by the two end sections of the latter member.

In the embodiment specifically shown in FIGS. 1 through 6, the retaining bars 38, 38' of the member 39 are in contact with the diaphragm spring 11, like the coupling member 30.

Alternatively (FIG. 10) clearance may be provided between them and the diaphragm spring 11, for the purpose of adaptation to different thicknesses of diaphragm spring.

Be this as it may, it results from the foregoing that the coupling member 30 is axially coupled to the clutch release device 11 in both axial directions, possibly with play.

In practice, the bearing surface 36 on the coupling member 30 with which the coupling ring 35 cooperates is oblique, being formed by the corresponding edge of the inside periphery of the coupling member 30, which to this end is terminated obliquely.

Conjointly, in the embodiments shown, the bearing surface 37 on the clutch release bearing 10 with which the coupling ring 35 also cooperates is perpendicular to the axis of this assembly and delimits a cylindrical bearing surface 61 on the bush 16 facing the bevelled end of the latter.

Finally, in these embodiments, elastic bearing means are provided which, bearing axially on the clutch release bearing 10 on the side of the clutch release device 11 opposite the coupling ring 35, bear axially on said clutch release device 11.

In practice, in the embodiments shown, this is an elastic ring 43 of the Belleville spring type.

In practice, the bearing surface 37 on the clutch release bearing 10 with which the coupling ring 35 cooperates is formed by one flank of an annular groove 45 provided for this purpose on said clutch release bearing 10, more precisely on the outside periphery of the bush 16 by virtue of which the latter extends axially through the clutch release device 11.

In accordance with the invention, the other flank 47 of the groove 45 is mounted so as to be axially mobile relative to the flank 37 of said groove 45 forming the bearing surface of the clutch release bearing 10 with which the coupling ring 35 cooperates.

Preferably, and as shown, this flank 47 of the groove 45 is oblique to the axis of the assembly, moving away from the bearing surface 37 as it moves away from said axis.

In practice, and as shown, it forms part of a member 48, referred to hereinafter for convenience as the decoupling member, which, separate from the bush 16 of the clutch release bearing 10, is mounted to slide axially on the latter but which, like this bush 16, also forms part of said clutch release bearing 10.

Overall, the decoupling member 48 forms a ring annularly encircling the bush 16 of the clutch release bearing 10.

In practice, the flank 47 of the groove 45 is formed by the corresponding edge of this decoupling member and, the external periphery of the latter having a diameter substantially equal to or even greater than that of the periphery of the cylindrical bearing surface 61 which delimits on the bush 16 the transverse bearing surface of this bush 16 forming the other flank 37 of said groove 45, it has a radial height which is substantially equal to or even greater than that of the other flank.

In the embodiments shown, the flanks 37, 47 of the groove 45 thus formed have substantially the same radial height.

For preference, and as shown, the elastic ring 43 forming the elastic bearing means associated with the coupling ring 35 bears on a transverse shoulder 50 axially facing the clutch release device 11 which the decoupling member 48 features to this end, so that it continuously urges the latter in the direction away from said clutch release device 11, more precisely in the direction towards a transverse abutment member provided for it on the clutch release bearing 10.

In the embodiments shown, this abutment member is formed by the corresponding edge of the inside ring 19 of the ball bearing 15 which the drive member 12 of the clutch release bearing 10 comprises, the bush 16 of said drive member 12, on which said decoupling member 48 is slidably mounted, forming a member which, separate from said inside ring 19, is appropriately attached to the latter.

In practice, the bush 16 is inserted axially into the inside ring 19 of the ball bearing 15 and it features in its median area a transverse shoulder 52 for one edge of the ring 19 to bear on, being crimped at its end to the other of said edges of said ring 19.

The result of this is, inter alia, that the ball bearing 15 may with advantage be a standard ball bearing, that is to say a ball bearing of which the inside and outside rings 19 and 26 have the same axial dimension.

Be this as it may, the result of the foregoing is that it is through the intermediary of the decoupling member 48 that the elastic ring 43 constituting the elastic bearing means associated with the coupling ring 35 bears on the clutch release bearing 10, more precisely on the ball bearing 15 of the drive member 12 of the latter.

In practice, in the embodiment shown, the shoulder 50 of the decoupling member 48 on which the elastic ring 43 bears is formed by one flank of the flange 55 projecting radially from the periphery of said decoupling member 48 and the other flank 56 of the flange 55 facing axially away from the clutch release device 11 forms, at a distance from the clutch release bearing 10, more precisely from the ball bearing 15 of the drive member 12 of the latter, a transverse shoulder adapted, as will emerge herinafter, for the action of any form of operating means on said decoupling member 48.

As shown in FIG. 5A, and as described in detail in the aforementioned U.S. patent application Ser. No. 571,671, the coupling member 30 is fitted in advance to the clutch release device 11.

The coupling ring 35 which bears against the bearing surface 36 provided for this purpose on the coupling member 30 then extends radially beyond the inside periphery of the coupling member 30, in the direction towards the axis of the assembly.

In order to assemble together, on the one hand, the clutch of which clutch release device 11 is in this way equipped with a coupling member 30 of this kind and, on the other hand, a clutch release bearing 10 in accordance with the invention, it is sufficient to offer up the latter axially on the axis of the central opening 18 in the clutch release device 11, and to insert its bush 16 axially into this central opening 18.

Through its end which is bevelled for this purpose, the bush 16 comes into contact with the coupling ring 35 (FIG. 5B) and pushes it elastically in the radial direction away from the axis of the assembly, the coupling ring 35 being conjointly retained in the axial direction by the member 39 of which it forms part, itself retained axially by the clutch release device 11 by virtue of its retaining bars 38, 38', possibly entailing temporary elastic deformation of the latter bars.

As the insertion of the clutch release bearing 10 continues, the transverse bearing surface 37 which the bush 16 of the latter features moves beyond the coupling ring 35 which elastically resumes its initial configuration, whilst the retaining bars 38, 38' of the member 39 of which it forms part engage radially in the corresponding groove 45 in said bush 16 (FIG. 5C).

In practice and as shown, and as a safety measure, axial engagement of the clutch release bearing 10 is systematically effected according to a predetermined travel which is definitely greater than that strictly necessary for the coupling ring 35 to thus enter the groove 45 on the bush 16.

Be this as it may, during this insertion, the elastic ring 43 is compressed so that, at the end of insertion, it causes the clutch release bearing 10 to move back, as a result of which, through the bearing surface 37 on its bush 16, it comes into engagement with coupling ring 35, with the latter maintained in contact with the corresponding bearing surface 36 on the coupling member 30 (FIG. 5D).

In practice, the edge 47 of the decoupling member 48 is then axially spaced from the coupling ring 35 and the width of the groove 45 in which the latter is housed is then maximal.

When the clutch release bearing 10 is subject to traction in the direction of the arrow F1 in FIGS. 1 and 5D by virtue of the action of the clutch release yoke controlling it, it itself exerts traction in the same direction on the clutch release device 11 through, in succession, the coupling ring 35 and the coupling member 30.

In accordance with the invention, axial detachment of the clutch release bearing 10 from the coupling member 30 is nevertheless possible.

It is sufficient (FIG. 6A) to insert any operating means 60, such as an ordinary screwdriver, for example, as shown here, between the clutch release bearing and the clutch release device 11, until it is possible to operate on the transverse shoulder 56 formed on the rear surface, facing away from the clutch release device 11, of the flange 55 of the decoupling member 48 and, by so doing, pushing the decoupling member 48 back axially in the direction towards the coupling ring 35, against the action of the elastic ring 43.

As will be noted, the operating means 60 thus employed can bear against the cover 24 of the clutch release bearing 10, more precisely on its inwardly directed rim 25.

By virtue of its oblique edge forming the flank 47 of the groove 45 in which the coupling ring 35 is normally disposed, the decoupling member 48, thus moved axially by sliding along the bush 16 of the clutch release bearing 10, elastically and radially urges the coupling ring 35 out of said groove 45, by progressively reducing the width of the latter, as previously with temporary elastic deformation of the retaining bars 38, 38' of the member 37 of which said coupling ring 35 forms part.

As the flanks 37 and 47 of the groove 45 have substantially the same radial height, it is then possible as shown schematically in FIG. 6B to disengage the bush 16 and thus the clutch release bearing 10 from the coupling ring 35, by applying to the clutch release bearing 10 a simple withdrawal movement in the direction of the arrow F1 in FIG. 6B, the coupling ring 35 being retained in a configuration in which it permits the cylindrical bearing surface 61 on said bush 16 to pass.

Insofar as the object of the present invention is concerned, the alternative embodiment shown in FIG. 7 is identical to that described hereinabove.

The only difference in this alternative embodiment is a different configuration of the member 39 of which the coupling ring 35 forms part.

In the embodiments shown in FIGS. 8 and 9, the coupling ring 35 forms a separate part independent of the retaining means employed to secure axial coupling of the coupling member 30 to the clutch release device 11.

In the embodiment specifically shown in FIG. 8, these retaining means consist of a cover 65 which covers the external periphery of the coupling member 30 and which, by virtue of arrangements described in detail in respect of an action or coupling member in U.S. patent application Ser. No. 535,071 filed 23 Sept. 1983, now U.S. Pat. No. 4,565,271, feature axial lugs 66 which extend through the clutch release device 11 by means of the slots 29 separating the fingers 28 of the latter with, at the end of each of these lugs 66, a radial lip 68 directed towards the axis of the assembly and carrying a circumferentially overhanging finger 70 by which it is adapted to bear on one of said fingers 28 of the clutch release device 11.

By virtue of arrangements described in detail in U.S. patent application Ser. No. 535,071 and which will thus not be described here, the fitting to the clutch release device 11 of the cover 65 and, with it, the coupling member 30, is effected by means of a bayonet type coupling, entailing temporary axial deformation of certain fingers 28 of the clutch release device 11.

In accordance with the invention, to retain the coupling ring 35 as it is moved out of the groove 45 in the clutch release bearing 10 by the decoupling member 48 provided for this purpose, in the process previously described, the cover 65 forms in front of the coupling member 30, that is to say on the side of the latter opposite that through which it bears on the clutch release device 11, an annular retaining cage 71 with which said groove 45 communicates.

In the embodiment shown in FIG. 9, the retaining cage 71 thus associated with the coupling member 30, instead of being formed by a cover attached to the latter, is formed by lugs 72 which, in one piece with the coupling member 30 which is in this instance obtained by stamping, rolling or any other material shaping technique, are folded radially crook-fashion in the direction towards the axis of the assembly.

Likewise, in this embodiment, the lugs 66 on the coupling member 30 carrying the fingers 70 retaining it on the clutch release device 11 by virtue of the aforementioned bayonet type coupling are crook-shaped.

In the embodiment shown in FIG. 11, the retaining cage 71 is formed in the thickness of the coupling member 30, by a groove of which one flank forms the shoulder 36 with which the coupling ring 35 cooperates.

For the remainder, the arrangements relating to the detachment of the clutch release bearing 10 from the coupling member 30 are identical to those described with reference to FIGS. 1 through 6.

The present invention is not limited to the embodiments described and shown, but encompasses all variations in execution and/or combinations of their various component parts.

That which we claim:

1. A pull-type clutch release bearing assembly having an axis and comprising a clutch release bearing coupled to a clutch release device of a clutch in at least one axial direction for operating the clutch release device, said clutch release bearing comprising a bearing member and an axial bush extending axially away from said bearing member through the clutch release device, a coupling member having a radial bearing flange engageable with a side of the clutch release device axially remote from said bearing member for actuating the clutch release device in the one axial direction, a radially deformable coupling ring disposed around the axis of the assembly for releasably connecting said coupling member and said axial bush, retaining means axially connecting said coupling member to the clutch release device, said coupling ring normally engaged between a bearing surface on said coupling member facing axially in the direction away from said bearing member and an opposite bearing surface on said axial bush facing axially in the direction toward said bearing member, said opposite bearing surface defining one flank of an annular groove, a decoupling member defining the other flank of said annular groove and mounted for axial sliding movement on said axial bush between a normal position relatively axially adjacent said bearing member and a decoupling position relatively axially remote from said bearing member in which said decoupling member is adapted to drive said coupling ring out from between said bearing surface and said opposite bearing surface so that the coupling ring is maintained in engagement with said coupling member.

2. Clutch release bearing assembly according to claim 1, wherein said other flank of said annular groove is inclined radially inwardly and away from said bearing member.

3. Clutch release bearing assembly according to claim 1, wherein said other flank of said groove is formed by an edge of said decoupling member facing axially in the direction away from said bearing member.

4. Clutch release bearing assembly according to claim 1, wherein elastic bearing means bias said decoupling member to its normal position into engagement with a transverse abutment surface on said bearing member.

5. Clutch release bearing assembly according to claim 4, wherein said elastic bearing means bears on a shoulder defined on said decoupling member and directed axially towards the clutch release device.

6. Clutch release bearing assembly according to claim 1, wherein said decoupling member has a transverse shoulder directed axially away from the clutch release device for moving said decoupling member from its normal position to its decoupling position.

7. Clutch release bearing assembly according to claim 5, wherein said decoupling member has a transverse shoulder directed axially away from the clutch release device for moving said decoupling member from its normal position in its decoupling position, said shoulders of the decoupling member being formed by the respective flanks of a radial flange projecting radially from the periphery of said decoupling member.

8. Clutch release bearing assembly according to claim 1, wherein said bearing member comprises a ball bearing having races, said bush being fixed to one of said races of said ball bearing.

9. Clutch release bearing assembly according to claim 4, wherein said bearing member comprises a ball bearing having races, said axial bush being fixed to one of said races of said ball bearing, and in that the abutment surface provided for said decoupling member is formed by a corresponding edge of said one race.

10. Clutch release bearing assembly according to claim 9, wherein said axial bush has a transverse shoulder in its median area for one edge of said one race to bear on, an opposite edge of said one race bearing against a crimped end of said axial bush axially remote from said opposite bearing surface.

11. Clutch release bearing assembly according to claim 10, wherein said other flank of said annular groove has a radial height substantially equal to or greater than that of said opposite bearing surface on said axial bush defining said one flank of said groove.

12. Clutch release bearing assembly according to claim 1, wherein said other flank of said annular groove has a radial height substantially equal to or greater than that of said opposite bearing surface forming said first flank of said groove, and the diameter of the external periphery of said decoupling member is substantially equal to or greater than that of the cylindrical bearing surface which delimits said other bearing surface on said axial bush.

13. Clutch release bearing assembly according to claim 1, wherein said coupling ring includes a part separate from said retaining means, a retaining cage associated with said coupling member and defining a space which communicates with said annular groove.

14. Clutch release bearing assembly according to claim 13, wherein said retaining cage is integral with said retaining means.

15. In a pull-type clutch release bearing assembly of the type including a clutch release bearing coupled to a clutch release device of a clutch in at least one axial direction for operating the clutch release device, the improvement wherein said clutch release bearing comprises a bearing member and an axial bush extending axially away from said bearing through a clutch release device, a coupling member having a radial bearing flange engageable with a side of a clutch release device axially remote from said bearing member for actuating a clutch release device in the one axial direction, a radially deformable coupling ring for releasably connecting said coupling member and said axial bush disposed around the axis of the assembly, retaining means axially connecting said coupling member to a clutch release device, said coupling ring normally engaged between a bearing surface on said coupling member facing axially in the direction away from said bearing member and an opposite bearing surface on said axial bush facing axially in the direction toward said bearing member, said opposite bearing surface defining one flank of an annular groove, a decoupling member defining rthe other flank of the groove and mounted for axial sliding movement on said axial bush between a normal position relatively axially adjacent said bearing member and a decoupling position relatively axially remote from said bearing member in which said decoupling member is adapted to drive said coupling ring out from between said bearing surface and said opposite bearing surface so that the coupling ring is maintained in engagement with said coupling member.

16. A method for decoupling a pull-type clutch release bearing, including a bearing member and an axial extension, from a coupling member normally retained on a clutch release device by a coupling ring ensuring movement of the clutch release bearing and the coupling member together in at least one axial direction for operating the clutch release device, the coupling ring being received in a groove on the extension of the bearing member between a flank on the extension facing the bearing member and another flank on a decoupling member axially slidable on the extension, the coupling ring normally held between a bearing surface formed on the coupling member facing away from the bearing member and an opposite bearing surface formed on the first mentioned flank; wherein the method comprises the steps of inserting an operating member into position against a transverse shoulder on the decoupling member facing away from the bearing member, urging the decoupling member away from the bearing member toward the clutch release device and thereby driving the coupling ring from between the bearing surfaces and out of the groove while the coupling ring maintains contact with the coupling member whereby the coupling ring and the coupling member remain attached to the clutch release device and then moving the clutch release bearing axially away from the coupling member.

17. A method according to claim 16, wherein the operating member bears against the clutch release bearing as it urges the decoupling member away from the bearing member.

* * * * *